United States Patent [19]

Werjefelt

[11] Patent Number: 4,683,880
[45] Date of Patent: Aug. 4, 1987

[54] TOXIC FUME PROTECTIVE HOOD AND METHOD OF CONSTRUCTION

[75] Inventor: Bertil Werjefelt, Kailua, Hi.

[73] Assignee: E.I. Du Pont de Nemours and Company, Wilmington, Del.

[21] Appl. No.: 494,845

[22] Filed: May 16, 1983

Related U.S. Application Data

[63] Continuation-in-part of Ser. No. 228,940, Jan. 27, 1981, Pat. No. 4,440,164, which is a continuation-in-part of Ser. No. 73,612, Sep. 10, 1979, Pat. No. 4,443,318, which is a continuation-in-part of Ser. No. 185,962, Sep. 10, 1980, Pat. No. 4,461,155.

[51] Int. Cl.⁴ .............................. A62B 7/00
[52] U.S. Cl. ..................... 128/201.28; 128/201.23
[58] Field of Search ............ 128/201.23, 201.24, 128/201.25, 201.26, 201.27, 201.28, 201.29, 202.22, 205.25, 205.24, 205.12, 204.18, 206.19, 206.12

[56] References Cited

U.S. PATENT DOCUMENTS

| | | | |
|---|---|---|---|
| 196,862 | 11/1877 | Bechtold | 128/201.29 |
| 645,281 | 3/1900 | Vajen | 128/201.28 |
| 1,071,223 | 8/1913 | Garrity | 128/201.23 |
| 1,253,485 | 1/1918 | Gunnarson | 128/201.27 |
| 2,143,960 | 1/1939 | Stalter et al. | 138/121 |
| 2,910,063 | 10/1959 | Monroe et al. | 128/205.24 |
| 3,521,629 | 7/1970 | Reynolds . | |
| 3,562,813 | 2/1971 | Origer | 128/201.23 |
| 3,858,615 | 1/1975 | Weigl | 128/204.18 |
| 4,207,883 | 6/1980 | Shindler | 128/201.25 |
| 4,466,432 | 8/1984 | Wise | 128/201.23 |

FOREIGN PATENT DOCUMENTS

| | | | |
|---|---|---|---|
| 67291 | 11/1976 | Japan | 128/201.25 |
| 430863 | 7/1975 | U.S.S.R. | 128/201.28 |

Primary Examiner—Henry J. Recla

[57] ABSTRACT

A smoke hood is provided which is highly compact, quickly assembled, and light-weight. The device is defined by a tubular, transparent portion made from KAPTON, having a closed upper end and a lower skirt portion adapted to fit over at least the head of a user. A neck seal is attached to the interior of the tube and is designed to allow the user to quickly put on the hood without allowing any of the outside environment to flow into the hood. Inflow and outflow valves are attached to the hood the former of which connects to an air supply system. A method for assembling the hood is also provided along with details of an inflow valve arrangement, an outflow valve arrangement, and a kink-free air supply hose structure.

11 Claims, 15 Drawing Figures

TOXIC FUME PROTECTIVE HOOD AND METHOD OF CONSTRUCTION

BACKGROUND OF THE INVENTION

1. Continuing Data

This application is a Continuation-in-Part of U.S. patent application Ser. No. 228,940, filed on Jan. 27, 1981 and now U.S. Pat. No. 4,440,164, which is, in turn, a Continuation-in-Part of U.S. patent application Ser. No. 73,612, filed on Sept. 10, 1979 and now U.S. Pat. No. 4,443,318, and of U.S. patent application Ser. No. 185,962, filed on Sept. 10, 1980 and now U.S. Pat. No. 4,461,155. The subject matter of all of these applications is expressly incorporated by reference herein.

2. Technical Field of Invention

The present invention relates to a new and improved breathing mask or hood which is adapted to the Life Support System disclosed in my co-pending application, U.S. Ser. No. 228,940, filed on Jan. 27, 1981 and now U.S. Pat. No. 4,440,164. The mask/hood provides the user with the capability of connecting to a continuous supply of fresh air in order to enable the user to survive in enclosed areas such as offices, hotels, hospitals, factories, aircraft, ships, mines, nuclear generating plants, missile silos, subways and personnel carriers during dangerous and/or emergency conditions. The breathing mask/hood (the two terms are used interchangeably hereinafter) is lightweight, highly compact, easy and quick to manipulate, and inexpensive to manufacture. Because of the mask's simple construction and design, a user can see in all directions, as well as verbally communicate with the outside world. Should the mask be either accidentally or deliberately disconnected from the fresh air supply, adequate air space exists within the interior of the mask to allow the use of fresh clean air, or oxygen, or an air-oxygen combination, for several critical minutes to enhance mobility and assist in escaping from noxious fumes. However, because the mask easily connects and disconnects to the air supply system disclosed in my above-identified application, only several seconds are needed for reconnection should it be desired. In addition, an improved air supply system is provided which enables a continued supply of air to be provided despite ruptures or breaks in the air supply pipes.

3. Discussion of the Prior Art

There has been a recent increase in the number of injuries and deaths of people who are trapped by smoke, fire, and/or noxious conditions existing in the above-described enclosed areas. As a result of this trend, it has become increasingly important to protect the users of these spaces from fire and smoke emergencies. To date, many systems have been devised for controlling and protecting people from fire. Yet, in the majority of fires and other emergencies, death and injury often result from smoke inhalation as well as from the fire itself.

Some of the poisonous gases that occur in smoke and toxic fumes are nearly instantly lethal. However, in most fires, trapped occupants have minutes, or even hours before the fire itself can harm them. Thus, although many high-rise structures are equipped with smoke detectors, sprinklers as well as strategically placed fire extinguishers, people located away from the fire must be additionally protected from the noxious fumes and poisonous smoke not controlled or even sensed by these devices. This is because smoke detectors only sense the existence of carbon monoxide or carbon dioxide, which are, respectively, lethal in concentrations of one part in 200 and one part in 50. Smoke detectors, however, do not sense hydrogen fluoride, which is lethal in concentrations of one part in 20,000, nor hydrogen cyanide (one part in 50,000), nitrogen dioxide (one part in 5,000), sulfur dioxide, (one part in 2,500), or hydrogen cloride (one part in 1,000). Thus, protection against such smoke and noxious fumes must be provided.

To protect users in such problem situations, solutions for facial breathing protection range from conventional, self-contained gas masks to filter-type gas masks, which in many cases do not even remove some common combustion by-products. Carbon monoxide and hydrogen cyanide, for example, are often not completely removed by a conventional gas mask's filters. In some cases, some masks are dangerous merely because of the fact that they are mounted over a user's head while smoke and fumes are already in the atmosphere, which inevitably therefore find their way into the mask.

More recent face mask designs placed on the market are also woefully inadequate. One example is a smoke hood which incorporates compressed breathable air. In this hood, air is contained in a small cylinder at pressures of about 5–6,000 pounds per square inch; this mask can supply clean, breathable air for five minutes, which is an inadequate period of time if one is trying to escape from the ninetieth floor of a burning structure, or from an airplane on fire. This effectiveness of this mask, of course, also depends on a non-defective cylinder. If the cylinder is defective, the cylinder can pose a threat to life, by acting as a small explosive.

Another common gas mask employs activated charcoal as a filter. However, activated charcoal loses its filtering ability after being exposed to ordinary humidity and, therefore, is useful for only ten to fifteen minutes under the best of conditions. Under many conditions, fire can consume all portions of available oxygen so that there may not be any fresh atmosphere left to filter and breath in an emergency with this type of device.

In light of the foregoing, therefore, meaningful protection against deadly smoke and noxious fumes cannot be accomplished by any of the known gas mask filters, escape hoods with self-contained breathing apparatus, smoke hoods with charcoal filters, or escape hoods with compressed air cylinders, but only by providing an unlimited supply of fresh air and by protecting the user from all outside fumes, smoke, and gases and, of course, flames. This the present invention is capable of achieving, by providing meaningful protection, i.e. several hours of protection from noxious fumes, which none of the prior art systems provide.

SUMMARY OF THE INVENTION

Accordingly, it is an object of this invention to overcome the deficiencies of the prior art by providing a smoke hood which provides an unlimited supply of fresh air and/or oxygen and which completely protects a user from all noxious fumes, gases and other by-products resulting in an emergency situation in an enclosed area.

It is another object of this invention to provide a smoke hood which is made of a lightweight, fire-resistant and gas-impermeable material in order to allow the mask to be carried conveniently by firemen, soldiers, police and the inhabitants and users of highrise buildings, aircraft, subways or any other enclosed structure.

It is a further object of this invention to provide an apparatus which is highly compact and portable so that it can be conveniently carried by people or vehicles, and easily connected to a variety of fresh-air supply systems.

It is yet another object of this invention to provide a smoke hood that is quickly and easily manipulatable, and which can protect any user, whether they be small infants or adults, from the entry of any noxious fumes into the interior of the mask without having to make adjustments or follow complicated instructions.

It is still a further object of this invention to provide a smoke hood which allows a user to see omni-directionally, and communicate with those on the outside or using other masks.

It is yet another object of this invention to provide a smoke hood which quickly connects and disconnects from an available source of unlimited fresh air.

It is still another object of this invention to provide a smoke hood that can contain enough portable breathable air and/or oxygen when disconnected from the air supply to allow a user to remain in a noxious environment for several minutes.

It is another object of this invention to provide a smoke hood which is easily manufactured using inexpensive and readily-available parts and equipment.

Finally it is an object of this invention to provide an air supply system adapted to be used with the smoke hood that continues to supply pressurized clean air when there is one or multiple breaks and ruptures in the air supply system.

This invention involves, in a first aspect thereof, a smoke hood for protecting a user from fire and inhalation of a noxious environment by providing a continuous supply of fresh air. The smoke hood is formed from a generally tubular portion having upper and lower ends and a continuous sidewall having inner and outer sides. The tubular portion is made from a transparent, fire-resistant gas-impermeable material, and has strips of reflective material respectively located on the upper and lower portions of the outer surface of the tubular wall in order to reflect heat and flames. The upper end of the tubular portion is secured, integrally or otherwise, to a circular hood portion made of fire-resistant gas-impermeable material as the tubular portion. In addition, the circular hood portion can be covered with a reflective surface made of the same material as the reflective strips located on the tubular portion. The bottom end of the tubular portion is enclosed by an annular resilient neck seal which is attached to the inner portion of the tubular portion wall. The neck seal has an opening for admitting at least the head of the user into the smoke hood while forming an air-tight closure around at least the head of the user. An inflow valve is attached to the smoke hood and is adapted to be attached to a hose which, in turn, attaches to the air supply system.

The present invention is provided for in a second aspect thereof by a method for constructing a smoke hood. The method involves placing a single-sided strip around the upper perimeter of a cylindrically-shaped jig mold so that the adhesive side of the tape faces outwardly. A circularly cut piece of film, made from a gas-impervious, fire-resistant material and having a reflective outer surface is then placed over the upper end of the cylindrical jig mold. A first hoop assembly is lowered over the top of the jig mold forcing the sides of the circular film downward onto the mold to adhere with the single-sided tape. Once they adhere, the first hoop is removed. A strip of double-sided tape is then wrapped around the mold in the same position as that of the single-sided tape in order that the double-sided tape adheres to the portions of the circularly cut film covering the single-sided tape. The circular mold is then rolled longitudinally along the long side of a rectangular flat film made from the same material as the circularly cut piece of film. Once on the mold, the short sides of the rectangularly cut piece of film are adhesively attached such that the rectangular piece now forms a cylinder. The hood assembly is then removed from the mold and the lower open end of the cylindrically-shaped film is rolled back such that it forms a skirt portion. A neck seal is then attached to the inner wall at the lower end of the cylindrical piece of film about the rolled portion, after which the rolled portion is unrolled. A valve hole is formed on the hood and an inflow valve is attached to the smoke hood.

These and other objects and advantages of this invention will be made apparent when considering the following detailed description, accompanying drawings, and appended claims.

BRIEF DESCRIPTION OF THE DRAWINGS

The above and other objects, features and advantages of the present invention will become more fully apparent to those of ordinary skill in the art to which the present invention pertains from the following detailed description, taken in conjunction with the accompanying drawings, in which.

DETAILED DESCRIPTION OF THE DRAWINGS

Figure 1:
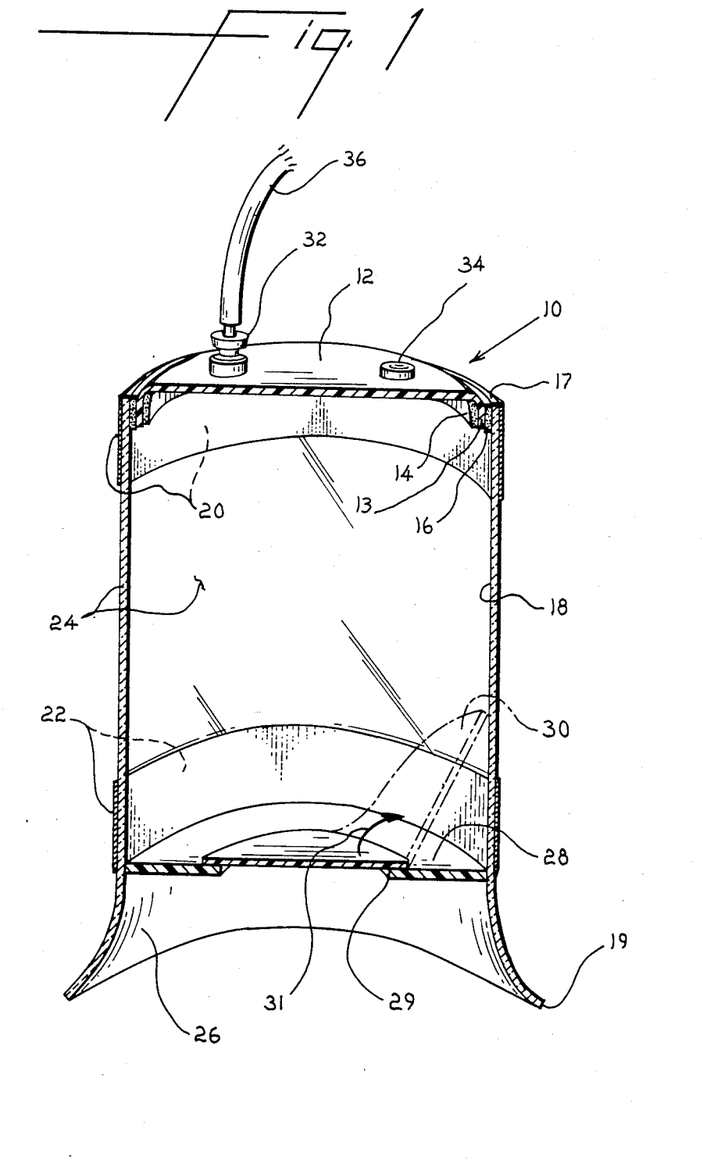
FIG. 1 is a cross-sectional side view of the present invention.

Referring more specifically to the drawings, wherein like reference numerals refer to like parts throughout the several drawings, FIG. 1 is a cross-sectional side view of the preferred embodiment of this device. A smoke hood 10 includes circular hood portion 12 having downward extending sidewalls 13 formed from the perimeter of hood portion 12. Circular portion 12 is formed from a flexible, light-weight material which is transparent, highly resistant to flames, to heat, to smoke and to fumes. One potential material having these characteristics is KAPTON, a fire-resistant and temperature-resistant polyimide film manufactured by the Dupont Chemical Corp. which could be supplied in sheet form having a thickness of 1 to 2 mil. This thickness would provide a non-tearable material that is both light-weight and flexible. Other materials having these or similar characteristics may also be used. To further improve the heat-resistant characteristics of the circular hood portion, a reflective layer can be located on the outer side of hood portion 12 in order to reflect heat and fire from mask 10. One material which can be used as the reflective layer is aluminum, which can either be vacuum-deposited (FIG. 1) or adhesively bonded to circular hood portion 12. The thickness of the aluminum coating should be approximately 250 Angstroms. However, any other suitable reflective materials and methods for attaching these materials can be employed.

The inner portion of sidewall 13 is adhesively secured to one-sided tape strip 14, which can comprise, e.g., KAPTON. The thickness of tape 14 is suitable to aid in rigidifying the top portion of hood 10, while also being flexible enough to allow the top portion of the hood to be collapsed. The outer portion of sidewall 13, in turn, is adhesively attached to the inner side of double-sided tape 16, which has the same characteristics and which is preferably formed of a comparable material to single-sided tape 14. The outer side of tape 16 is secured to upper edge 17 of tubular portion 18, which comprises an open-ended, yet endless sealed cylinder. The material of tubular portion 18 is comparable to that of circular portion 12 and is also transparent. KAPTON, for example, is a potential material for tubular portion 18, although other materials are not excluded. Tubular portion 18 and upper hood portion could also be integrally molded, or similarly integrally formed if desired.

The outer portion of tube 18 is either secured to, or coated with, a pair of reflective bands 20 and 22, which are, respectively, contiguous with upper edge 17 and lower edge 19. Bands 20 and 22 are suitably wide to adequately protect the head of a user above and below the eyes, and of suitable length to extend about the full circumference of tubular portion 18. The widths of bands 20 and 22 are sufficient to allow a complete omni-directional view through transparent band 24. Because hood 10 is an emergency hood, bands 20, 22 and 24 are suitably dimensioned to protect the upper body and allow adequate vision for both adults and children alike. The bands are preferably formed of, e.g., aluminum, vacuum deposited or adhesively secured to tubular portion 18.

A substantially annular neck seal 28 is adhesively secured to the inner portion of tubular portion 18 at a point that is sufficiently above lower edge 19 to allow that portion of tube 18, located below neck seal 28, to act as a protective skirt for the body of a user. The material of neck seal 28 is flexible and resilient, while also being substantially heat and gas resistent. Commercially available silicone sheets having a 12 mil thickness, for example, are suitable although other materials having comparable characteristics to silicone can also be used. The central portion of neck seal 28 has a circular opening 29 with a diameter that is slightly less than the diameter of a small human neck size. Preferably, the diameter of opening 29 should be 2.5 inches which can be expanded to 13 inches. A flap valve 30 having a generally circular configuration and a diameter greater than opening 29, but less than that of neck seal 28, is located over opening 29 and secured to neck seal 28. The flap valve may be glued to neck seal 28 such that the whole flap valve is detachably secured, i.e., easily displaced, by moderate pressure applied upward through hole 29. In order to both seal the flap and allow relatively effortless displacement. The perimeter of flap valve 30, which overlaps neck seal 28, would be coated with a strippable adhesive, such as silicone glue, or any other comparable mastic. Alternatively, a small portion of the perimeter of flap valve 30 can be coated with a non-strippable adhesive such that it will act as a hinge when the remainder of flap valve 30 is displaced (as shown by the dotted lines in FIG. 1). The neck seal, therefore, enables the user to easily force his head into the interior of smoke hood 10, while also forming an air and gas tight seal between the hood and a portion of the body of the user, e.g. the head of an adult or the trunk of a child.

As previously described, skirt portion 26, formed by the lower portion of substantially cylindrical tube 18, is located below neck seal 28. The diameter of skirt 26 gradually increases toward lower edge 19 in order to accommodate various body areas, such as a neck, shoulder, chest, arms, or waist, dependent upon the size of the user.

An adjustable air inflow valve 32 and outflow valve 34 are each secured to circular portion 12. A connector tube portion of inflow valve 32 is connected to air hose 36 which is, in turn, connected to a fresh air supply system. Alternately, either or both valves can be attached to the body of tube 18.

Figures 2, 3, 4, 5:
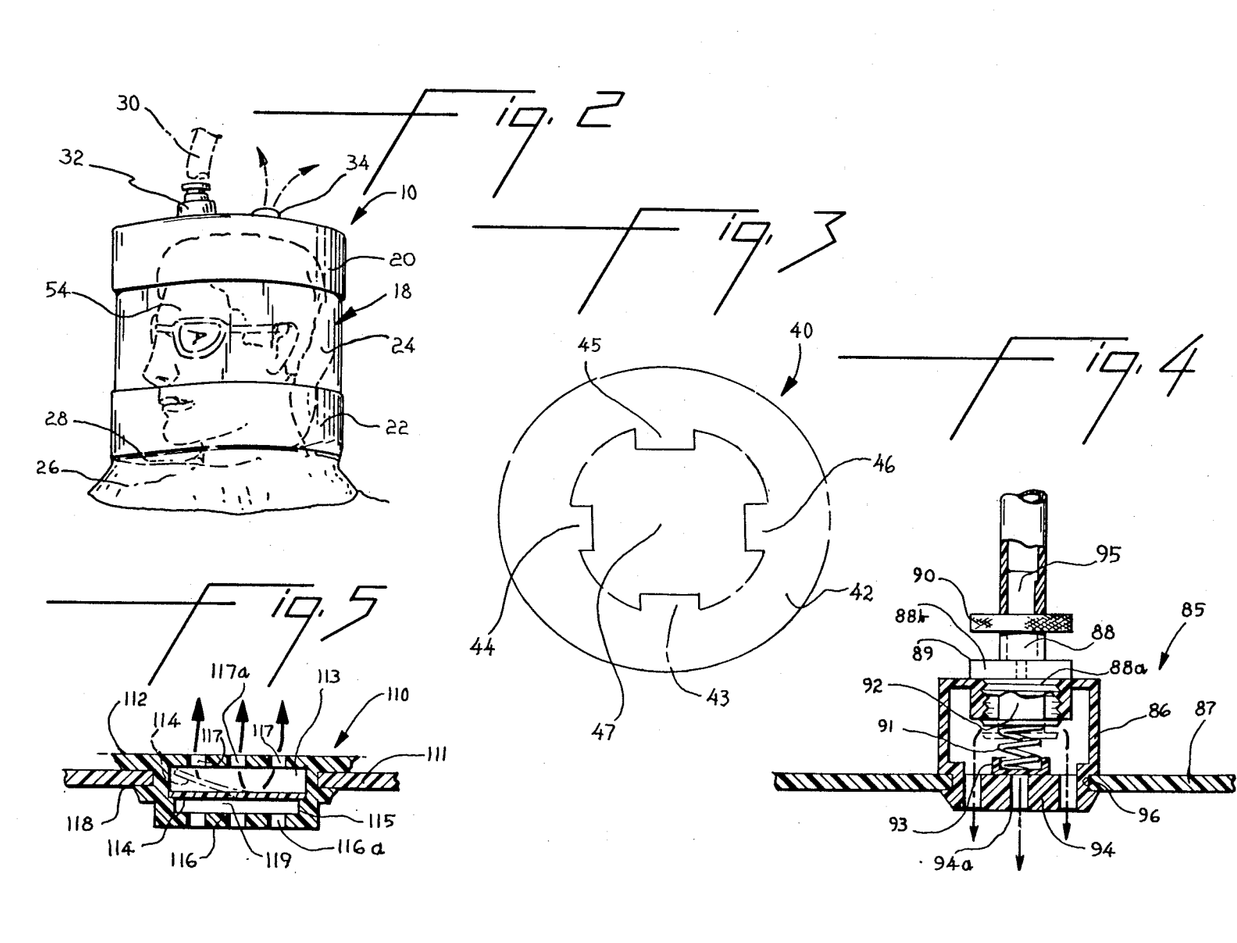
FIG. 2 is a side view of a hood formed in accordance with the present invention in use.
FIG. 3 is a cross-sectional side view of the kink free hose used with the hood of FIGS. 1 and 2.
FIG. 4 is a cross-sectional side view of the inflow valve used with the hood of FIGS. 1 and 2.
FIG. 5 is a cross-sectional side view of an outflow valve used with the hood of FIGS. 1 and 2.
Figure 2A:
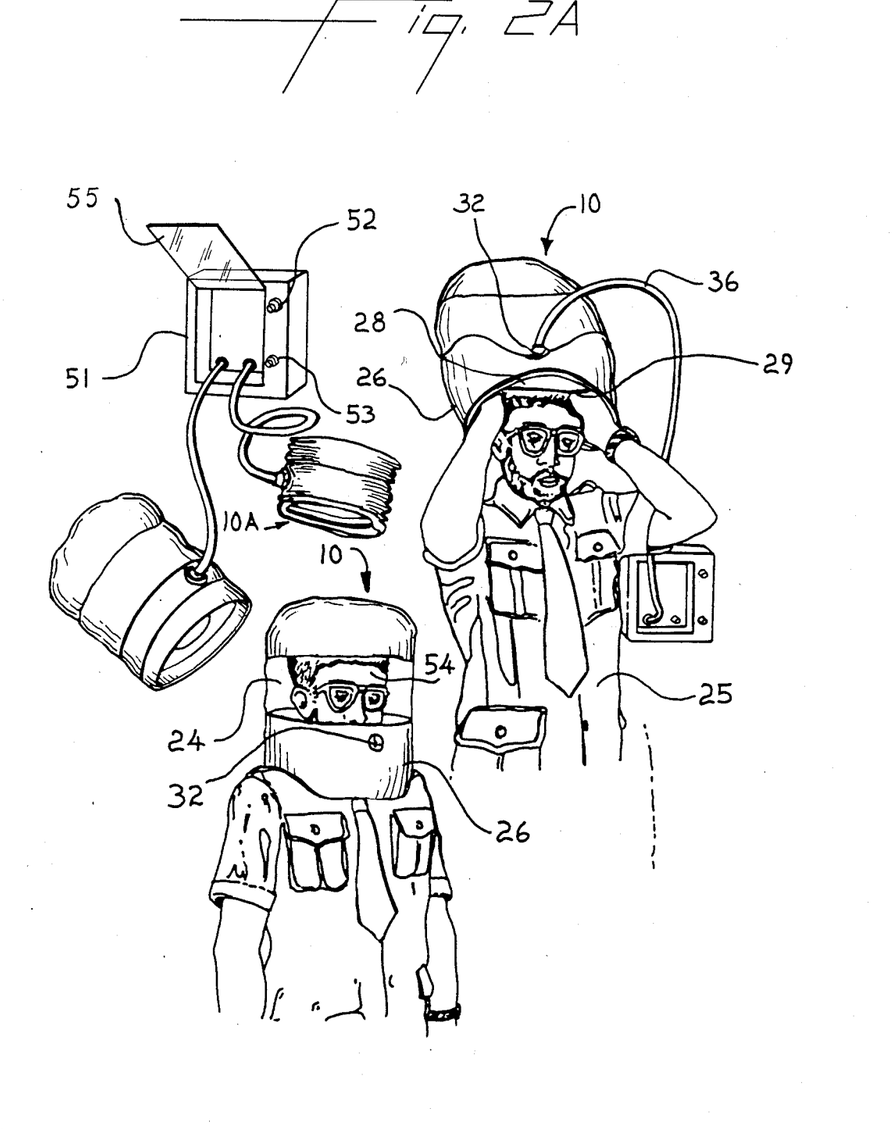
FIG. 2A is a multiple view of a method for putting on the hood of FIGS. 1 and 2.

Operation of the smoke hood can be manual or automatic. For manual operation, as shown in FIG. 2A, a user grasps the edges of circular opening 29 of neck seal 28 such that flap valve 30 is slightly displaced. User 25 then pulls circular opening 29 wider such that they can easily fit their head through the neck seal and butt their head against flap valve 30 until the valve is displaced in the direction shown by arrow 31 of FIG. 1. The user 25 then pulls hood 10 down over their head until neck seal 28 engages their neck or below, and the eyes of the user are aligned with transparent band 24 of the hood. As shown in FIGS. 2 and 2A, once hood 10 is placed on head 54, and skirt 26 is completely extended, the user can breath fresh air flowing through inflow valve 32. Because the neck seal forms an air tight seal with the body of the user, exhalation will cause air to escape only through outflow valve 34 (FIG. 2). The volume of the interior of the hood, as defined by tubular portion 18 and the neck seal and the circular top portion, is 26.07 liters. The 26.07 liter size has been selected based on anthropological studies that show that the volume of the average human head is 5.4 liters; therefore, selection of an approximately 26 liter volume for the head ensures that the hood will be able to function as a portable, supplemental breathing container when disconnected from an air supply system for a period of time sufficient to allow people to leave most emergency situations. Of course, the hood could be made of any volume greater than the volume of the head of a user. Removal of hood 10 is accomplished by pulling the hood upwardly until the neck seal 28 clears the head of the user.

Hood 10 can be automatically operated by packing hood 10 into storage element 51 and closing hinged door 55. The hood is automatically released by depressing button 52 whereupon door 55 springs open and compressed hood 10A falls out. Upon compressing button 53 the air will flow through hose 36 and, thereby expand hood 10A into filled version 10B. The expanded version is desirable as it allows fresh breathable air to immediately fill the hood interior as well as push any surrounding fumes that may flow into the interior of the hood when it is placed on the user's head.

Figure 2B:
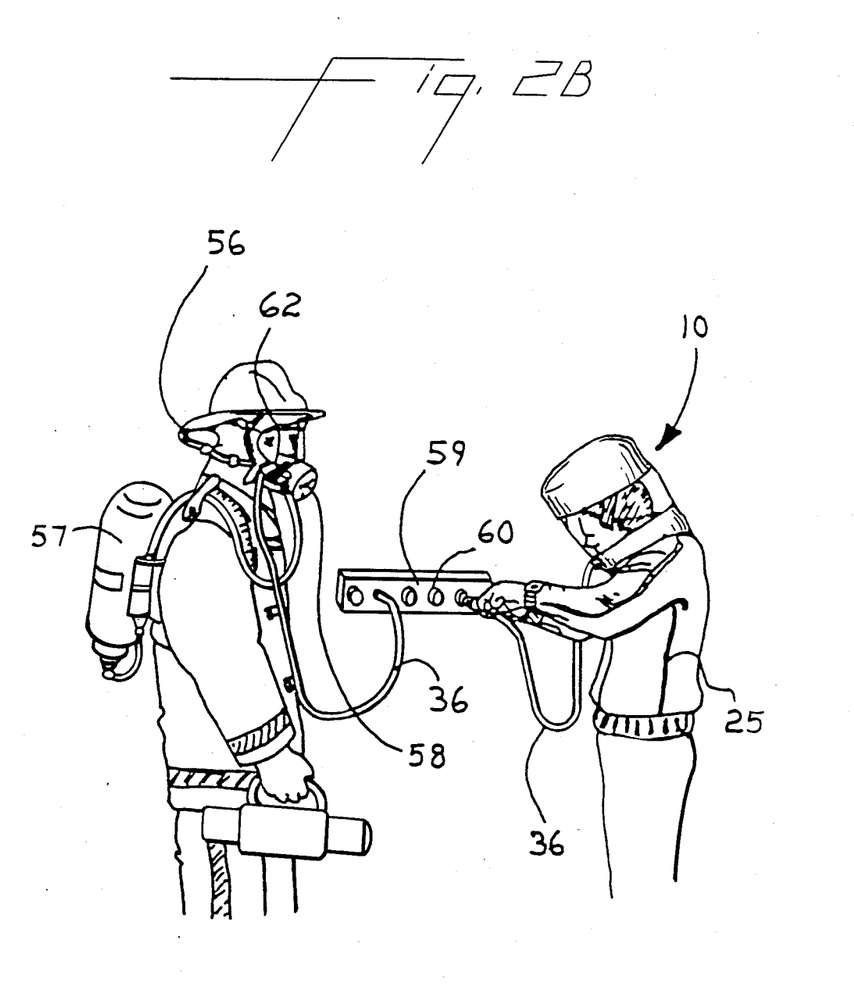
FIG. 2B is a view of a method for connecting the hood of FIGS. 1 and 2 and a second embodiment of the hood, adapted to be used as a firefighter mask.

FIG. 2B shows the method for connecting hood 10 to air supply station 59. Specifically, user 25 places the air supply connector portion of hose 36 into connection with air supply valve 60 which is constructed to open only when in contact with hose 36. The air supply system is adapted to provide a low air pressure to hood by providing a pressure of between 1.5" to 3.0" of H$_2$O.

Other hoods may also connect to this system. As shown in FIG. 2B a firefighter mask 56 can be adapted to connect to valve 60 by providing inlet valve 62 on mouthpiece portion 58. Valve 62 is connected to hose 36 which is adapted to connect to supply station 59.

In use, when supply tank 57 runs low or if the firefighter wishes to preserve the air supply stored in the tank he connects hose 36 to air supply valve 60 such that an alternate air supply is either flowed into tank 57 or mask 56.

Because the hood only weights 6 to 14 ounces it is highly portable. Furthermore, due to the desirable characteristics of KAPTON combined with the reflective strips the hood can be operated in environments of 650° F. and withstand open flames of 1,200° F. for short duration. Furthermore, the hood can be stored in environments having temperatures ranging between −380° F. to 650° F. Under proper storage conditions the hood should have a shelf life of ten years.

FIG. 3 is a cross-sectional side view of a kink-free hose 40 which can be used as the air supply hose to smoke hood 10. The hose has a thickened tubular wall portion 42 having a series of flanges 43, 44, 45, and 46, which are located around the inner perimeter of wall 42, substantially surrounding air passage 47. The flanges run parallel with the longitudinal axis of hose 40 and, therefore, act to slightly rigidify wall 42. This effect, therefore, enables the hose to be moved, twisted, and bent without developing a kink that would cut off the air supply and possibly endanger the life of the wearer of hood 10.

FIG. 4 is a cross-sectional side view of one representative inflow valve 85, having a body portion 86, adjustable portion 88, piston member 92 and spring 91. Specifically, body portion 86 is cylindrical and has a frustoconical head portion 94 with three air flow passages 94a, and an annular channel portion 96 separating head 94 from main body 86. The end of body 86 is defined by a central circular portion 89 having threaded walls. A substantially cylindrical adjustable portion 88 having threaded end 88a, stopper flange 88b, knurled disk 90 and connector tube 95, threadably engages the interior threaded portion 89 of valve body 88 such that turning knurled disc 90 allows adjustable portion 88 to lower into or raise out of body portion 86. Centrally located spring biased piston member 92 is disposed within the open end of adjustable portion 88, such that if piston 92 is fully inserted into adjustable portion 88, it will fully enclose the end of portion 88. Spring 91, having one end located within annular wall 93 and having an opposite end abutting piston 92, is thereby adjustably biased by displacement of adjustable portion 88.

The valve is adjusted by turning knurled disk 90, which either raises or lowers piston 92 and, therefore, respectively compresses or expands spring 91. If air pressure flowing into hood 87, for example, needs reducing, then a user turns knurled disk 90 in the appropriate direction to lower adjustable portion 88 upon compressed spring 91, and to thereby increase the upward pressure on piston 92, which restricts air flow into the smoke hood. Other conventional valves could equally advantageously be utilized.

FIG. 5 is a cross-sectional side view of one representative outflow valve 110. The valve is defined by annular, substantially conical body portion 112 having an interior valve upper chamber 113, flexible reed valve 114 contained within chamber 113 and lower chamber 119. The bottom end of chamber 119 opposite valve 114 is enclosed by wall 116, having air flow inlet apertures 116a. Similarly, the upper end of chamber 113 is enclosed by outer wall portion 117 having air flow outlet passages 117a. Valve 110 operates when the user of the hood exhales, increasing the internal pressure inside the hood. This causes reed valve 114 to be displaced to a position indicated by the dotted line such that air escapes through outlet air flow passages 117a until a reduction in pressure allows reed valve 114 to close to its initial position. The outlet valve, therefore, allows air to escape without letting surrounding air, gas, or smoke into chamber 116 and, therefore, into the hood. Again, as with the inflow valve, the outflow valve can take the form of any conventional valve instead of the one illustrated.

Both inflow valve 85 and outflow valve 110 can be attached to the smoke hood at any portion that communicates with the interior chamber of the hood. The substantially conical shape of both valves enables the valves to be readily pushed into a pre-existing aperture until the hood wall (111 in FIG. 5 and 87 in FIG. 4) is engaged by their annular channels (118 in FIG. 5 and 96 in FIG. 4). The materials for the valves include light weight, heat-resistant thermally nonconductive materials, e.g., suitable plastics, although aluminum is acceptable due to its low cost and low weight.

Figure 6:
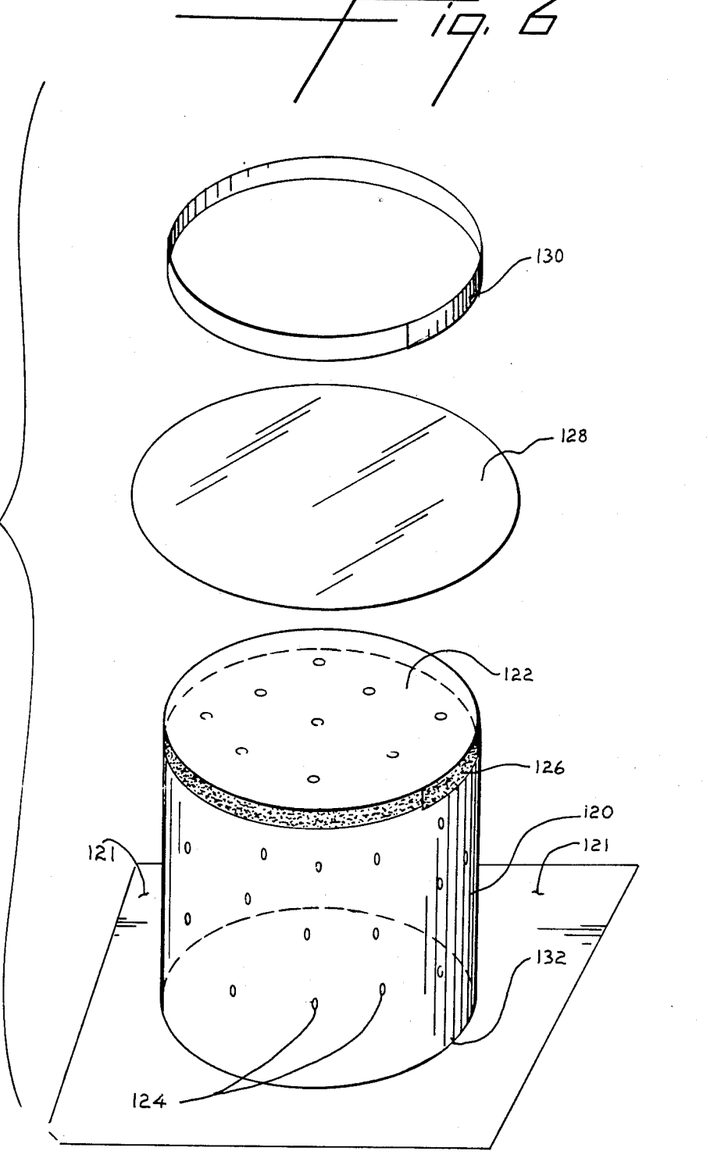
FIG. 6 is an exploded view of the apparatus used in assembly of the top portion of one embodiment of the present invention.

A method and apparatus for forming a smoke hood in accordance with the present invention is illustrated in FIGS. 6–12. FIG. 6 shows a first step in forming the hood, which uses apparatus having a cylindrical jig mold 120 having closed end portions 122 and 132 and a plurality of stamped air holes 124 located about all portions of the jig mold. The bottom end of mold 120 rests on surface 121. Single-sided adhesive tape 126, corresponding to tape 14 shown in FIG. 1, is tightly wrapped around the upper end of the mold sidewall with its sticky surface facing outwardly, and its ends overlapped, such that the tape is frictionally held against jig mold 120. Placement of tape 126 is critical, and must be adjacent to the upper edge of jig mold 120.

Figure 7:
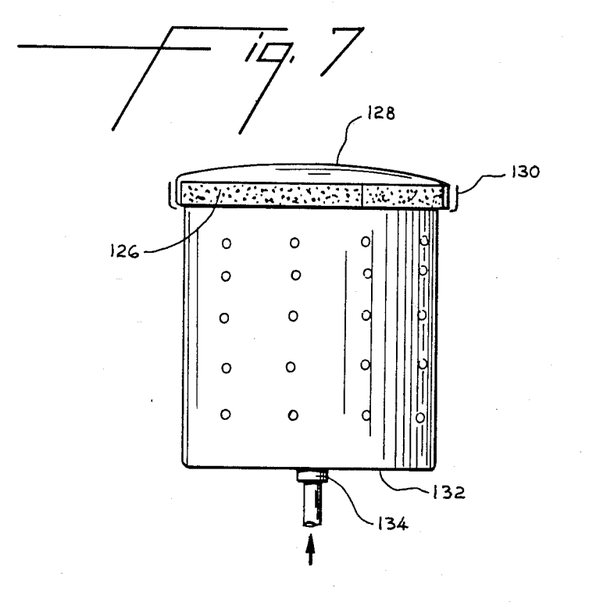
FIG. 7 is a side view of a completed top assembly being formed.

Once tape 126 is firmly in place, circular film piece 128, which corresponds to the circular hood piece 12 of FIG. 1, is placed over upper jig mold end 122. The diameter of circular film piece 128 exceeds that of jig mold 120 in combination with tape 126, such that correct placement of circular film 128 provides an even perimeter that extends beyond the circumference of jig mold end 122. A first adjustable hoop assembly 130 having an adjustable circumference (not shown) which is set to be slightly greater than jig mold 120, is then lowered over jig mold top 122 and down over jig mold sides 120. The mold thereby engages the aforementioned perimeter of circular film piece 128, thus forcing it down over the jig mold sidewall and into contact with single-sided tape 126, as best shown in FIG. 7. Once circular film 128 has adhered to tape 126, hoop 130 is removed by sliding it upwardly or downwardly off of jig mold 120.

Figure 8:
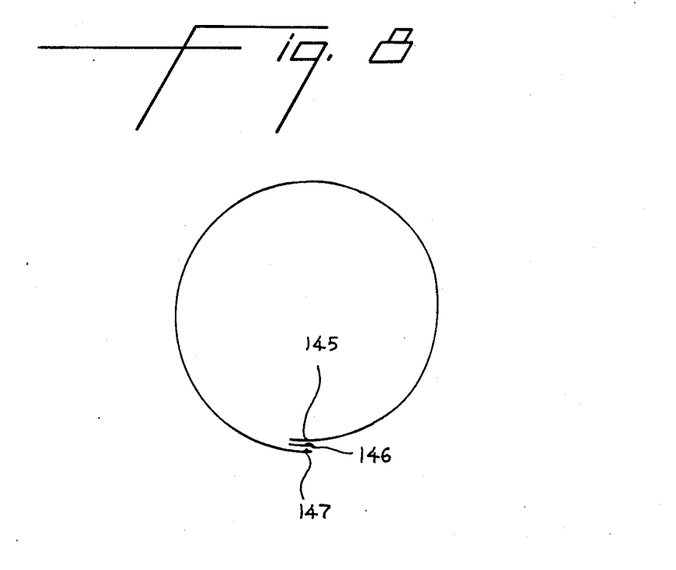
FIG. 8 is a schematic top view of the attachment of the short sides of the rectangular flat film portion of the present invention.
Figure 9:
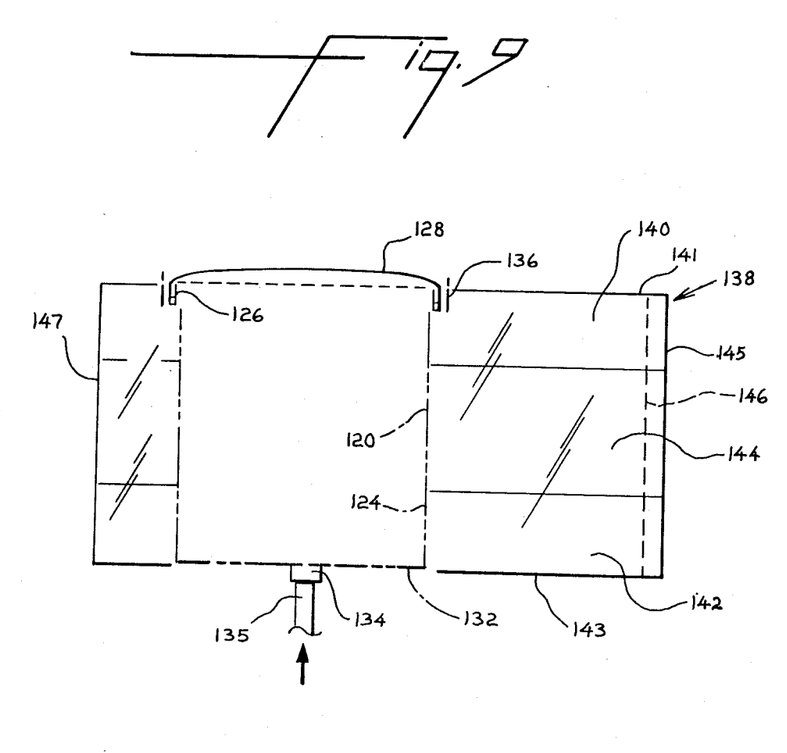
FIG. 9 is a schematic side view of a jig mold rolled along the rectangular flat film portion during formation of a hood in accordance with the present invention.

A strip of double-sided tape 136, that corresponds to tape 16 of FIG. 1, is then wrapped over the downwardly extending wall of circular film 128 so that it directly overlies single-sided tape 126. As shown in FIG. 9, the mold assembly is then oriented so that top mold portion 122 and bottom portion 132 are aligned in parallel fashion to long sides 141 and 143 of rectangular flat film piece 138, which corresponds to tubular portion 18 of FIG. 1. Jig mold 120 is then rolled longitudinally along film 138 wherein double-sided tape 136 adheres to rectangular piece 138 to form a substantial cylinder. As shown in FIG. 8, a second double-sided tape 146 is attached to short side 145 of rectangular film piece 138 and is then secured to short side 147, which effectively seals rectangular piece 138 into a cylinder. As a result, a cylinder having a closed upper end 128 and an open lower end 143 is formed.

Following this step, the assembly is removed from jig mold 120 by either manual or automatic means. To aid in the removal process, pressurized air is flowed through the pipe 135, through inlet 134 and into the interior of mold 120. The air consequently flows through air holes 124, which force the hood assembly off mold surface 120.

Figure 11:
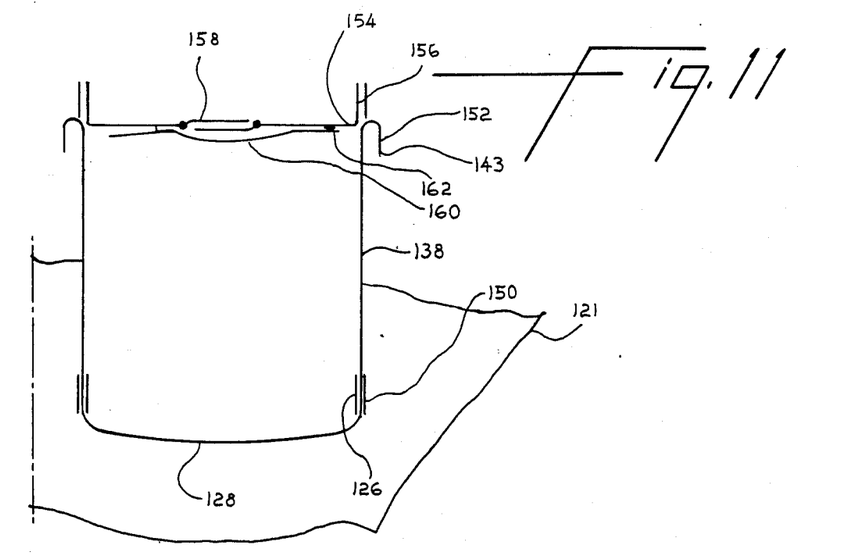
FIG. 11 is a schematic view of a neck seal assembly.
Figure 12:
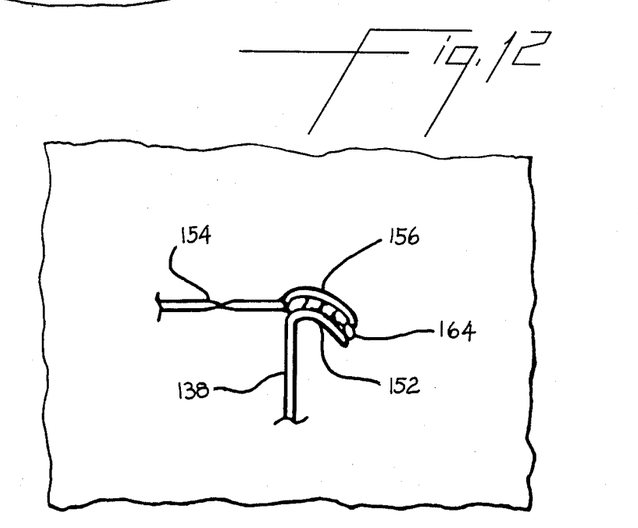
FIG. 12 is a side view of a neck seal lip assembly.

As shown in FIG. 11, once the hood assembly is removed, it is inverted so that upper end 128 is placed on surface 121 and lower end 143 is upright. The inverted lower end 143 of tubular portion 138 is folded down toward surface 121 such that an annular skirt or cuff is formed around the perimeter of tubular portion 138. Optimally, the skirt should be a minimum of four inches in width. However, as long as an approximately 26 liter volume is maintained in the interior of the hood, the skirt portion can be longer. After the skirt is folded, neck seal 154 is adhesively secured to the inner wall of tubular portion 138 by adhering neck seal lip 156 to skirt portion 152. As shown in FIG. 12, the lip 156 has a width equal to skirt portion 152 and is bonded thereto by adhesive 164. Although any suitable adhesive may be employed, silicone cement is particularly desirable for this application.

Figure 10:
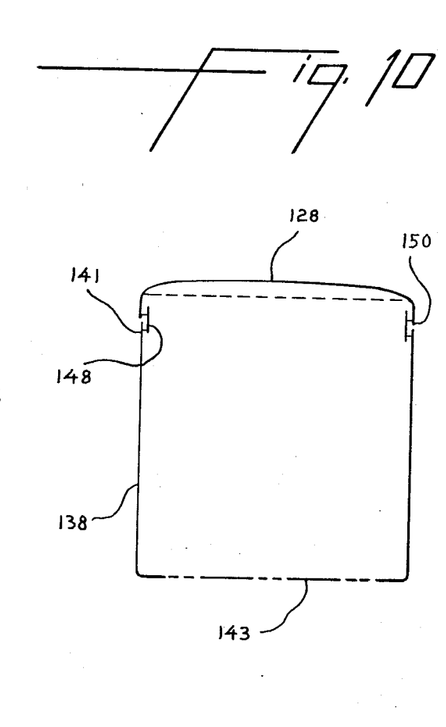
FIG. 10 is a schematic view of an alternate manner of attaching the circular and rectangular portions of the hood of the present invention.

FIG. 10 is a schematic diagram of an alternate method for constructing the hood assembly in which short sided tape 148, having a width greater than that of short sided tape 126, is wrapped around jig mold 120 in a manner similar to that previously described. Circular portion 128 is then forced down over jig mold 120 by first hoop 130 until the perimeter of circular portion 128 adheres to the upper circumference of tape 148. Mold 120 is then aligned with rectangular piece 138 such that when the mold is rolled over piece 138, longer side 141 will abut edge 150 of circular portion 128 and will also adhere to the lower circumference of short single-sided tape 126. A closed top end 128 of the smoke hood is thereby assembled with only one piece of tape.

Figure 13:
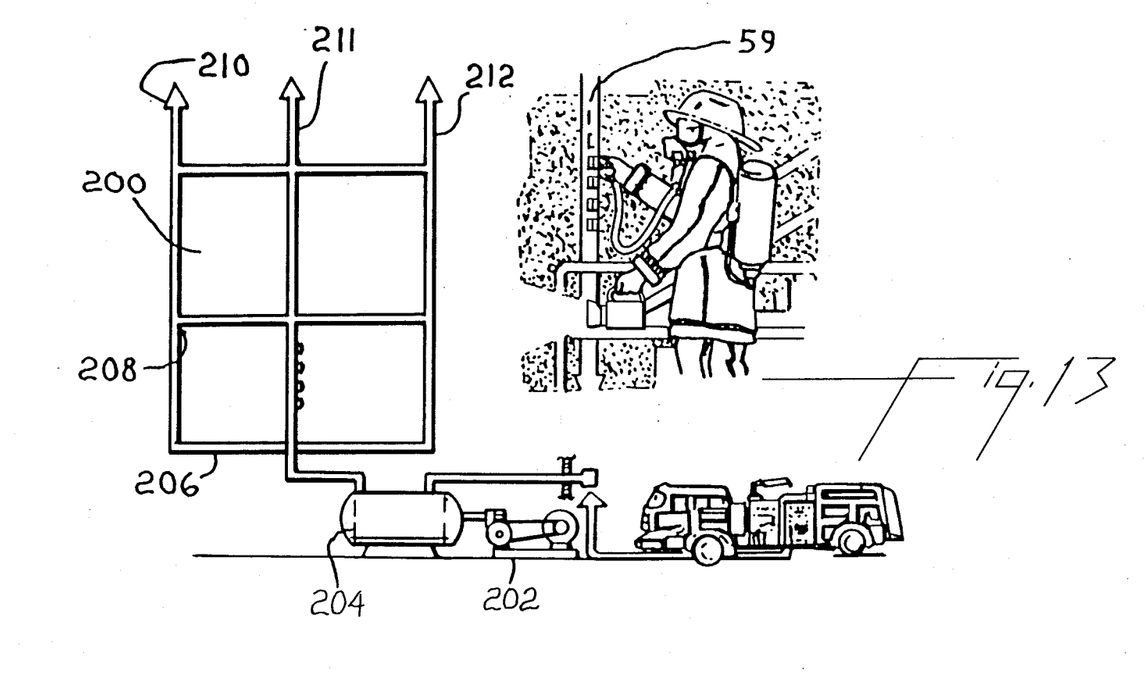
FIG. 13 is a schematic view of a break-proof air supply system adapted to be used with the hoods of FIGS. 1–2B.

FIG. 13 illustrates an air supply system 200 which is adapted to provide a continuous supply of fresh air at the aforementioned pressure level to the smoke hood of this invention. In addition, supply system 200 is constructed to supply uninterrupted air when a break and/or rupture in the system occurs. System 200 consists of air supply compressor 202 which supplies pressurized air to supply tank 204. Tank 204, in turn, supplies pressurized air to supply lines 212, 214 and 216, that separately connect to floor supply lines 206, 208 and 210. Each floor, therefore, has multiple air supplies and as a result, will be provided with uninterrupted air supply should a break or rupture occur along any of the above-mentioned supply lines.

Although the present invention has been described with respect to specific features, embodiments, and advantages, it is clear that a variety of such embodiments, features and advantages, can be contemplated within the scope of the present invention.

What is claimed is:

1. A smoke hood for protecting the user of said hood from fire and inhalation of a noxious surrounding environment, said smoke hood comprising
    (a) a generally tubular portion having open upper and lower ends and a continuous sidewall having inner and outer side surfaces, said generally tubular portion being comprised of a fire-resistant and gas-impermeable transparent film;
    (b) a first reflective strip located on the outer side of said continuous sidewall adjacent to said upper end;
    (c) a second reflective strip located on the outer side of said continuous wall adjacent to said lower end;
    (d) a generally circular hood portion, the peripheral edges of which are secured to the tubular portion, comprised of said fire-resistant and gas-impermeable film, said circular hood portion being connected to the upper end of said tubular portion;
    (e) a substantially annular, resilient neck seal, the peripheral edges of which are secured to the tubular portion, attached to the inner side portion of the lower end of said tubular portion, said neck seal having an opening for admitting at least the head of a user into said smoke hood to form an air-tight closure around said user, said neck seal being attached to the inner side portion of the lower end of said tubular portion sufficiently above the lower edge to form a protective skirt for the body of the user;
    (f) an inflow valve attached to said smoke hood and adapted to be connected to a hose that communicates with an air supply system in order to conduct fresh air to the interior of said hood; and
    (g) an outflow valve attached to said smoke hood and adapted to permit air to escape from the hood with increased internal pressure inside the hood, and wherein said tubular portion and said circular hood portion are distinct elements adhesively attached to each other by double-sided tape of fire-resistant and gas-impermeable transparent material.

2. The apparatus of claim 1 wherein said tubular portion is attached to said circular hood portion by double-sided KAPTON tape.

3. The apparatus of claim 1 wherein said first and second reflective consist of aluminum strips which are vacuum deposited onto said generally tubular portion.

4. The apparatus of claim 1 further comprising a flap valve detachably secured to said neck seal and covering said neck seal opening, said flap valve being adapted to be displaced when the head of the user is inserted into said smoke hood.

5. The apparatus of claim 4 wherein said flap valve is substantially circular and has a greater diameter than said neck seal opening.

6. The apparatus of claim 5 wherein the perimeter of said flap valve that overlaps said neck seal is attached to said neck seal by a pressure-sensitive strippable adhesive.

7. The apparatus of claim 6 wherein said flap valve is comprised of MYLAR.

8. The apparatus of claim 7 wherein said neck seal is comprised of silicone.

9. The apparatus of claim 1 wherein said inflow valve comprises an adjustable portion for selectively controlling the volume of incoming air and wherein said inflow valve further comprises an annular channel portion adapted to securely interfit with the fabric of said smoke hood.

10. A smoke hood for protecting the user of said hood from fire and inhalation of a noxious surrounding environment, said smoke hood comprising:
   (a) a generally tubular portion having open upper and lower ends and a continuous sidewall having inner and outer side surfaces, said generally tubular portion being comprised of a fire-resistant and gas-impermeable transparent film;
   (b) a first reflective strip located on the outer side of said continuous sidewall adjacent to said upper end;
   (c) a second reflective strip located on the outer side of said continuous wall adjacent to said lower end;
   (d) a generally circular hood portion, the peripheral edges of which are secured to the tubular portion, comprised of said fire-resistant and gas-impermeable film, said circular hood portion being connected to the upper end of said tubular portion;
   (e) a substantially annular, resilient neck seal, the peripheral edges of which are secured to the tubular portion, attached to the inner side portion of the lower end of said tubular portion, said neck seal having an opening for admitting at least the head of a user into said smoke hood to form an air-tight closure around said user, said neck seal being attached to the inner side portion of the lower end of said tubular portion sufficiently above the lower edge to form a protective skirt for the body of the user;
   (f) an inflow valve attached to said smoke hood and adapted to be connected to a hose that communicates with an air supply system in order to conduct fresh air to the interior of said hood; and
   (g) an outflow valve attached to said smoke hood and adapted to permit air to escape from the hood with increased internal pressure inside the hood, and wherein said tubular portion and said circular hood portion are distinct elements adhesively attached to each other by double sided tape of fire-resistant and gas-impermeable transparent material and wherein the double-sided tape is Kapton ® polyimide.

11. A smoke hood for protecting the user of said hood from fire and inhalation of a noxious surrounding environment, said smoke hood comprising:
   (a) a generally tubular portion having open upper and lower ends and a continuous sidewall having inner and outer side surfaces, said generally tubular portion being comprised of a fire-resistant and gas-impermeable transparent film;
   (b) a first reflective strip located on the outer side of said continuous sidewall adjacent to said upper end;
   (c) a second reflective strip located on the outer side of said continuous wall adjacent to said lower end;
   (d) a generally circular hood portion, the peripheral edges of which are secured to the tubular portion, comprised of said fire-resistant and gas-impermeable film, said circular hood portion being connected to the upper end of said tubular portion;
   (e) a substantially annular, resilient neck seal, the peripheral edges of which are secured to the tubular portion, attached to the inner side portion of the lower end of said tubular portion, said neck seal having an opening for admitting at least the head of a user into said smoke hood to form an air-tight closure around said user, said neck seal being attached to the inner side portion of the lower end of said tubular portion sufficiently above the lower edge to form a protective skirt for the body of the user;
   (f) an inflow valve attached to said smoke hood and adapted to be connected to a hose that communicates with an air supply system in order to conduct fresh air to the interior of said hood;
   (g) an outflow valve attached to said smoke hood and adapted to permit air to escape from the hood with increased internal pressure inside the hood; and
   (h) a flap valve detachably secured to said neck seal and covering said neck seal opening, said flap valve being adapted to be displaced when the head of the user is inserted into said smoke hood.

* * * * *